(12) United States Patent
Uenaka

(10) Patent No.: US 7,564,483 B2
(45) Date of Patent: Jul. 21, 2009

(54) ANTI-SHAKE APPARATUS

(75) Inventor: Yukio Uenaka, Tokyo (JP)

(73) Assignee: HOYA Corporation, Tokyo (JP)

( * ) Notice: Subject to any disclaimer, the term of this patent is extended or adjusted under 35 U.S.C. 154(b) by 708 days.

(21) Appl. No.: 11/065,577

(22) Filed: Feb. 25, 2005

(65) Prior Publication Data

US 2005/0190268 A1    Sep. 1, 2005

(30) Foreign Application Priority Data

Feb. 27, 2004    (JP)    ............................ P2004-053273

(51) Int. Cl.
*H04N 5/228*    (2006.01)
(52) U.S. Cl. ........................ 348/208.99; 396/53; 396/55
(58) Field of Classification Search ............ 348/208.99, 348/208.2, 208.3, 208.4, 208.11, 208.13, 348/207.99, 208.1; 396/55, 53
See application file for complete search history.

(56) References Cited

U.S. PATENT DOCUMENTS

| 5,109,249 | A | * | 4/1992 | Kitajima | ........................ | 396/53 |
| 5,974,269 | A | | 10/1999 | Sato et al. | | |
| 6,181,875 | B1 | * | 1/2001 | Hamada et al. | ................ | 396/55 |
| 6,985,176 | B2 | * | 1/2006 | Noguchi | ................. | 348/208.11 |
| 2003/0067544 | A1 | | 4/2003 | Wada | | |

FOREIGN PATENT DOCUMENTS

| JP | 10-142647 | | 5/1998 |
| JP | 11-055584 | A | 2/1999 |
| JP | 2002-229090 | | 8/2002 |
| JP | 2002-229090 | A | 8/2002 |
| JP | 2003-110919 | | 4/2003 |
| JP | 2003-149701 | A | 5/2003 |
| JP | 2003-348393 | A | 12/2003 |
| JP | 2004-007220 | A | 1/2004 |

OTHER PUBLICATIONS

English Language Abstract of JP 2002-229090.
English Language Abstract of JP 10-142647.
English Language Abstract of JP 2003-110919.
U.S. Appl. No. 11/044,055 to Uenaka et al., filed Jan. 28, 2005.

(Continued)

*Primary Examiner*—David L Ometz
*Assistant Examiner*—Ahmed A Berhan
(74) *Attorney, Agent, or Firm*—Greenblum & Bernstein, P.L.C.

(57) ABSTRACT

An anti-shake apparatus of a photographing-apparatus, comprises a movable unit, a fixed unit, an indicating unit, and a control apparatus. The movable unit has an imaging device and can be moved in first-and second-directions. The first-direction is perpendicular to an optical axis of a photographing lens of the photographing-apparatus. The second-direction is perpendicular to the optical axis and the first-direction. The fixed unit slidably supports the movable unit in both the first and second-directions. The indicating unit indicates an image imaged by the imaging device. The control apparatus controls moving the movable unit and detecting a position of the movable unit. The control apparatus prohibits indicating the image on the indicating unit, from when the photographing-apparatus is set to the on state, until the movable unit has reached a specified point of a movement range of the movable unit.

8 Claims, 14 Drawing Sheets

OTHER PUBLICATIONS

U.S. Appl. No. 11/044,054 to Uenaka, filed Jan. 28, 2005.
U.S. Appl. No. 11/044,010 to Uenaka et al., filed Jan. 28, 2005.
U.S. Appl. No. 11/065,354 to Uenaka et al., filed Feb. 25, 2005.
U.S. Appl. No. 11/073,638 to Uenaka et al., filed May 8, 2005.
U.S. Appl. No. 11/073,604 to Uenaka, filed Mar. 8, 2005.
U.S. Appl. No. 11/071,234 to Uenaka, filed Mar. 4, 2005.
U.S. Appl. No. 11/071,220 to Uenaka et al., filed Mar. 4, 2005.
U.S. Appl. No. 11/071,241 to Uenaka, filed Mar. 4, 2005.
U.S. Appl. No. 11/071,242 to Uenaka, filed Mar. 4, 2005.
U.S. Appl. No. 11/078,367 to Seo, filed Mar. 14, 2005.
U.S. Appl. No. 11/052,041 to Nemoto et al., filed Feb. 8, 2005.
English language Abstract of JP 2003-149701 A (May 21, 2003).
English language Abstract of JP 11-055584 A (Feb. 26, 1999).
English language Abstract of JP 2004-007220 A, Jan. 8, 2004.
English language Abstract of JP 2003-348393 A, Dec. 5, 2003.

* cited by examiner

Fig. 11
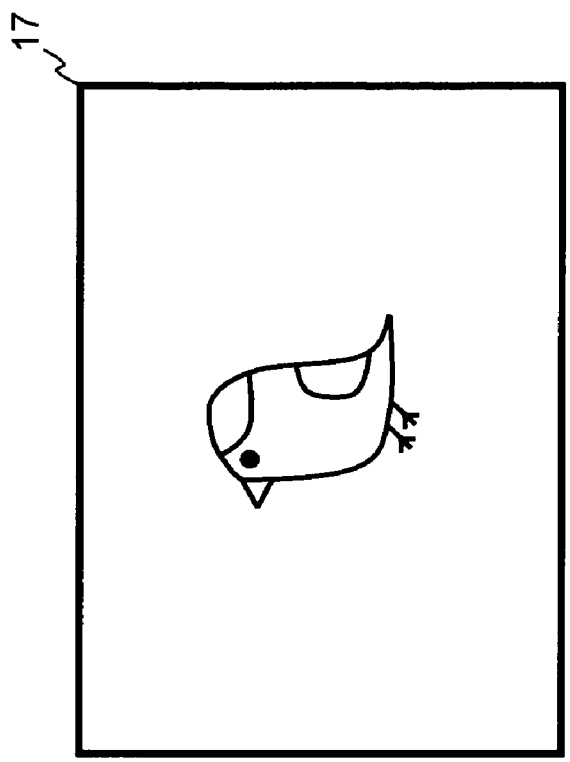
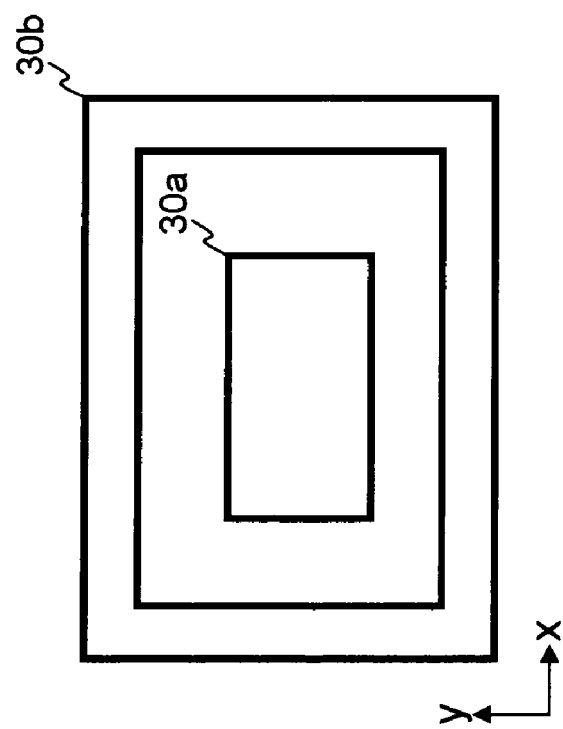

Fig. 12
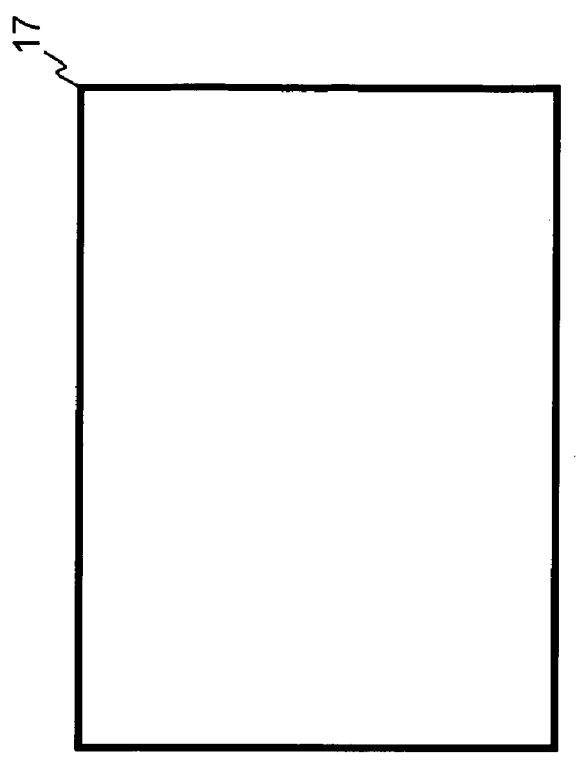
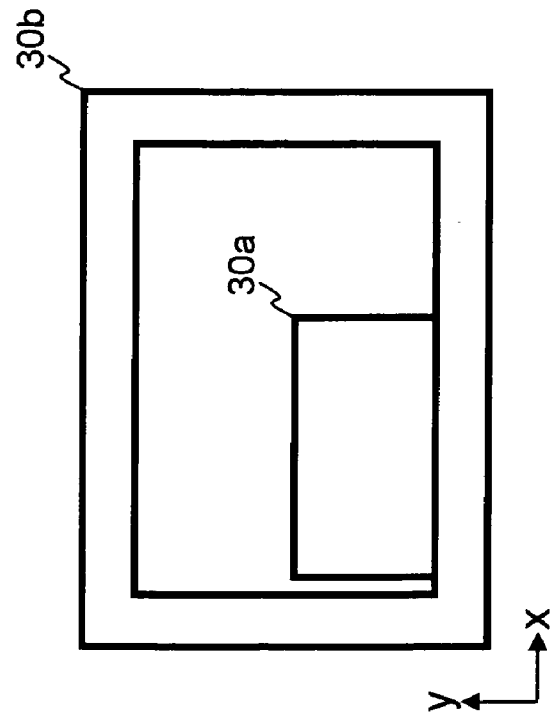

Fig. 14
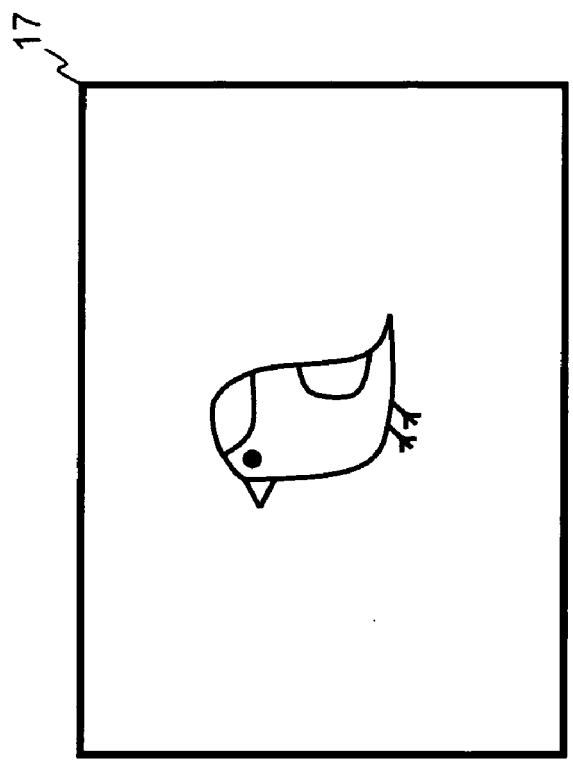
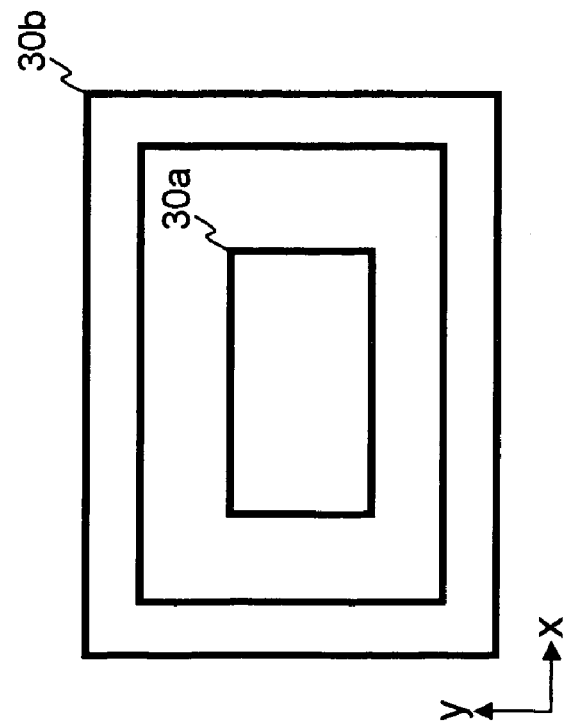

ANTI-SHAKE APPARATUS

BACKGROUND OF THE INVENTION

1. Field of the Invention

The present invention relates to an anti-shake apparatus for a photographing device (apparatus), and in particular to a position-detecting apparatus for a movable unit that includes the imaging device etc., and that can be moved for correcting the hand-shake effect.

2. Description of the Related Art

An anti-shake apparatus for a photographing apparatus is proposed. The anti-shake apparatus corrects for the hand-shake effect by moving a hand-shake correcting lens or an imaging device on a plane that is perpendicular to the optical axis, corresponding to the amount of hand-shake which occurs during imaging.

In the case where an anti-shake apparatus which does not have a fixing-mechanism for fixing the movable unit to the center of its movement range, is used for the anti-shake operation, the movable unit can be moved on a plane which is perpendicular to an optical axis of the photographing apparatus according to gravity, so that the movable unit is usually positioned at a contact-point which contacts an outer circumference of its movement range, while the photographing apparatus which includes the anti-shake apparatus, is in the off state.

After the photographing apparatus is set to the on state, the movable unit which is positioned at the contact-point, is moved to the center of its movement range, so that the anti-shake operation is started by moving the movable unit on the plane which is perpendicular to the optical axis.

In another case where an anti-shake apparatus which has a fixing-mechanism for fixing the movable unit to the center of its movement range, is used for the anti-shake operation, the movable unit is fixed at the center of its movement range by the fixing-mechanism, while the photographing apparatus which includes the anti-apparatus, is in the off state.

While the photographing apparatus is in the on state, the fixing condition by the fixing-mechanism is cancelled.

Japanese unexamined patent publication (KOKAI) No. 2002-229090 discloses an anti-shake apparatus for a photographing apparatus. The anti-shake apparatus does not have a fixing-mechanism, and performs a moving operation of a movable unit, which includes a hand-shake correcting lens, by using a magnet and a coil.

However, in this anti-shake apparatus, there is a time lag from when the photographing apparatus is set to the on state, to when the movable unit has reached the center of its movement range, when using the coil and the magnet. During this time, an indicating unit which is included in the photographing apparatus, indicates an image which is imaged by the imaging device. The image which is indicated on the indicating unit during this time, is an image which is imaged where the imaging device is moving and is like a floating image, so that this image is unpleasant for the operator.

Japanese unexamined patent publication (KOKAI) No. H10-142647 discloses an anti-shake apparatus for a photographing apparatus. The anti-shake apparatus has a fixing mechanism, and performs a moving operation of a movable unit, which includes a hand-shake correcting lens.

In this anti-shake apparatus, there is no time lag, so that the image, which is unpleasant for the operator, is not indicated. However, the anti-shake apparatus is enlarged due to the fixing-mechanism.

SUMMARY OF THE INVENTION

Therefore, an object of the present invention is to provide an apparatus which does not indicate an image which is unpleasant for the operator due to a floating image, and also does not have a mechanism which fixes the movable unit to the center of its movement range, such as a motor etc. in an anti-shake apparatus.

According to the present invention, an anti-shake apparatus of a photographing apparatus, comprises a movable unit, a fixed unit, an indicating unit, and control apparatus.

The movable unit has one of an imaging device and a hand-shake correcting lens, and can be moved in first and second directions. The first direction is perpendicular to an optical axis of a photographing lens of the photographing apparatus. The second direction is perpendicular to the optical axis and the first direction.

The fixed unit slidably supports the movable unit in both the first and second directions.

The indicating unit indicates an image imaged by the imaging device.

The control apparatus controls moving the movable unit and detecting a position of the movable unit.

The control apparatus prohibits indicating the image on the indicating unit, from when the photographing apparatus is set to the on state, until the movable unit has reached a specified point of a movement range of the movable unit.

BRIEF DESCRIPTION OF THE DRAWINGS

The objects and advantages of the present invention will be better understood from the following description, with reference to the accompanying drawings in which:

FIG. 11 shows the third condition after the movable unit 30a has reached the center of its movement range;

FIG. 12 shows the fourth condition before the movable unit is moved, in this embodiment;

FIG. 14 shows the sixth condition after the movable unit has reached the center of its movement range, in this embodiment.

DESCRIPTION OF THE PREFERRED EMBODIMENTS

Figure 1:
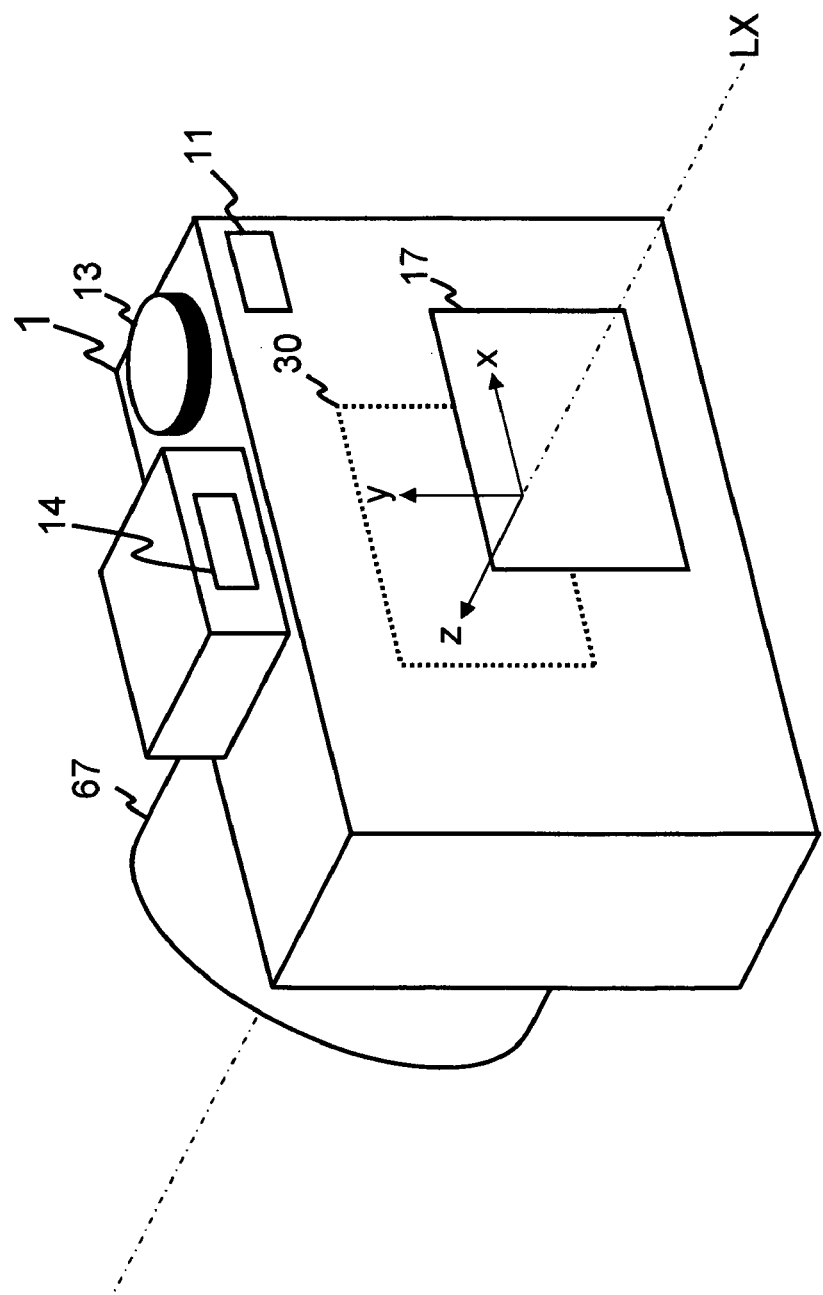
FIG. 1 is a perspective view of a photographing apparatus of the embodiment viewed from the back side of the photographing apparatus.

The present invention is described below with reference to the embodiments shown in the drawings. In this embodiment, the photographing device 1 is a digital camera. The photographing device 1 has an optical axis LX.

In order to explain the direction in this embodiment, a first direction x, a second direction y, and a third direction z are defined (see FIG. 1). The first direction x is a horizontal direction which is perpendicular to the optical axis LX. The second direction y is a vertical direction which is perpendicular to the optical axis LX and the first direction x. The third direction z is a horizontal direction which is parallel to the optical axis LX and perpendicular to both the first direction x and the second direction y.

Figure 4:
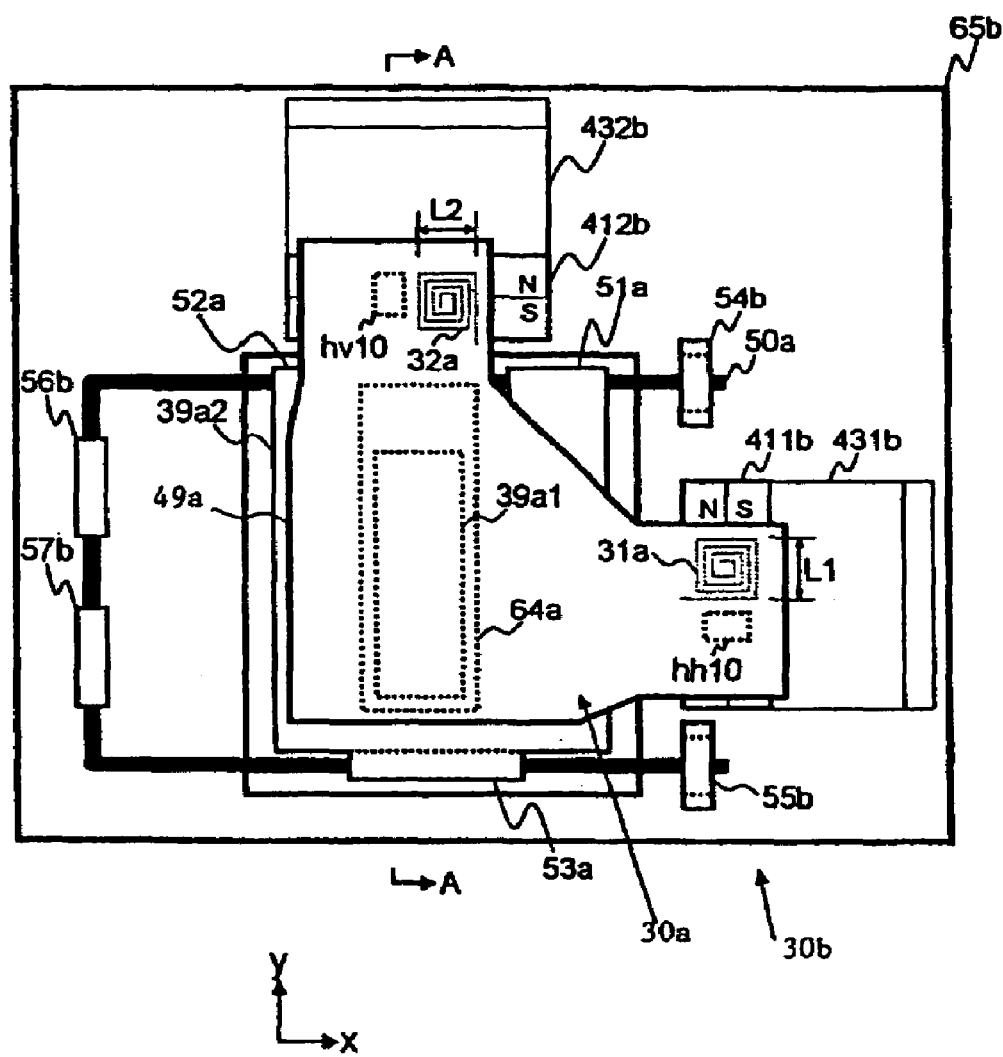
FIG. 4 is a figure showing the construction of the anti-shake unit.
Figure 5:
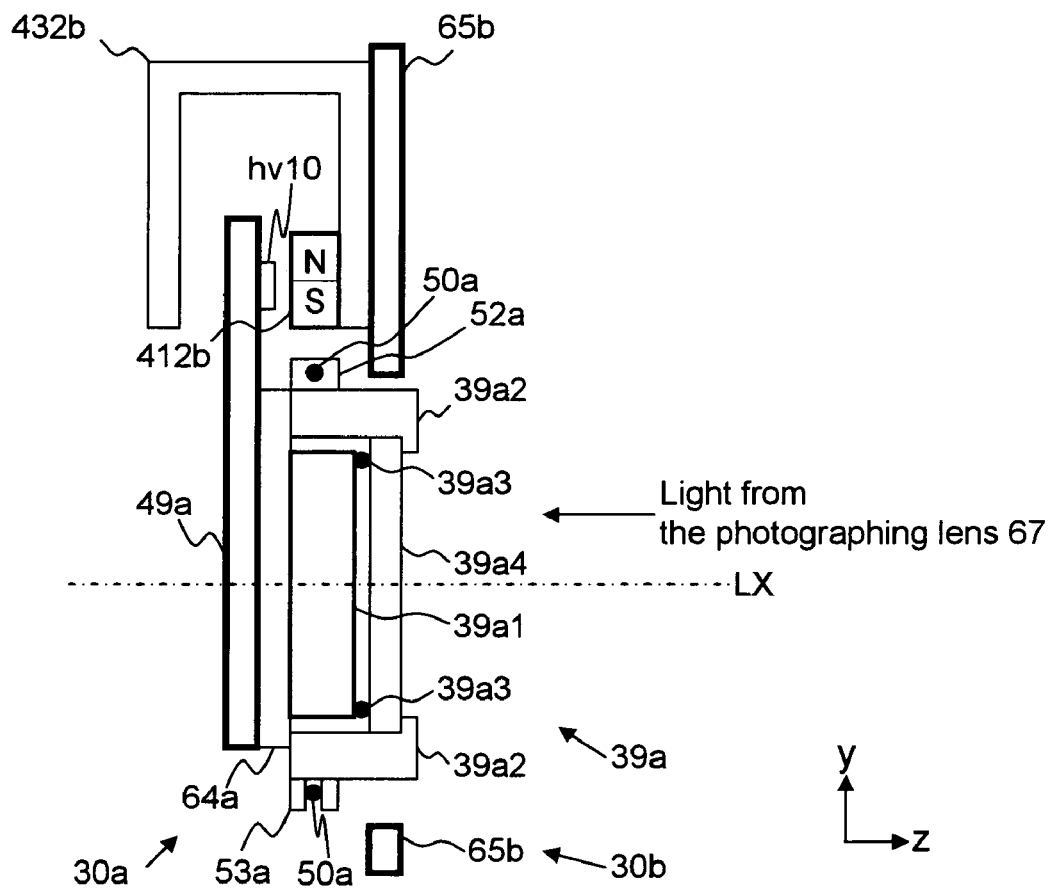
FIG. 5 is a view along line A-A of FIG. 4.

FIG. 5 shows a construction diagram of the section along line A-A of FIG. 4.

Figure 2:
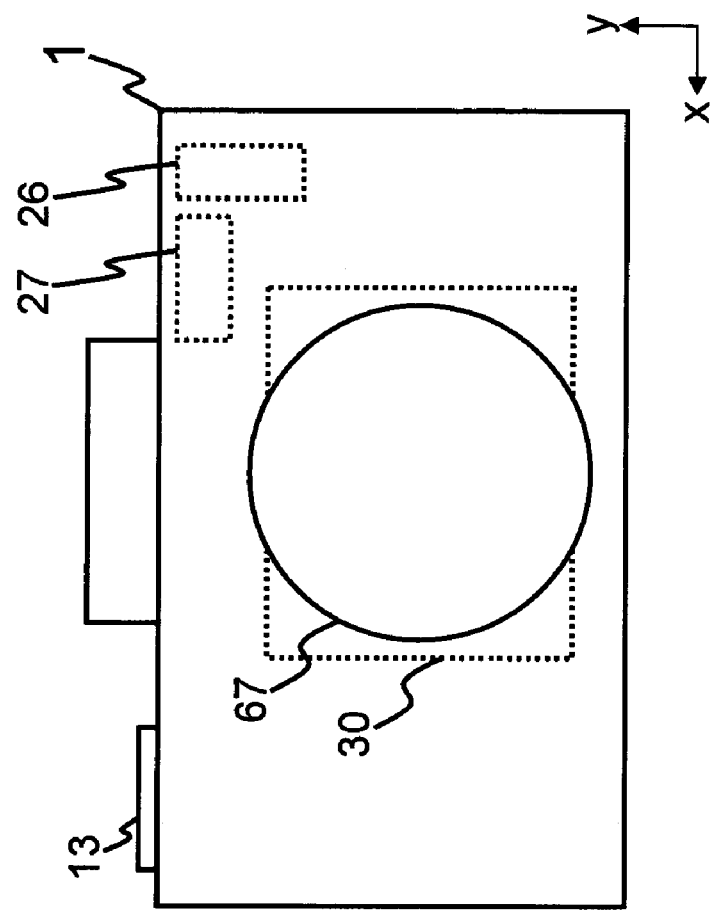
FIG. 2 is a front view of the photographing apparatus.
Figure 3:
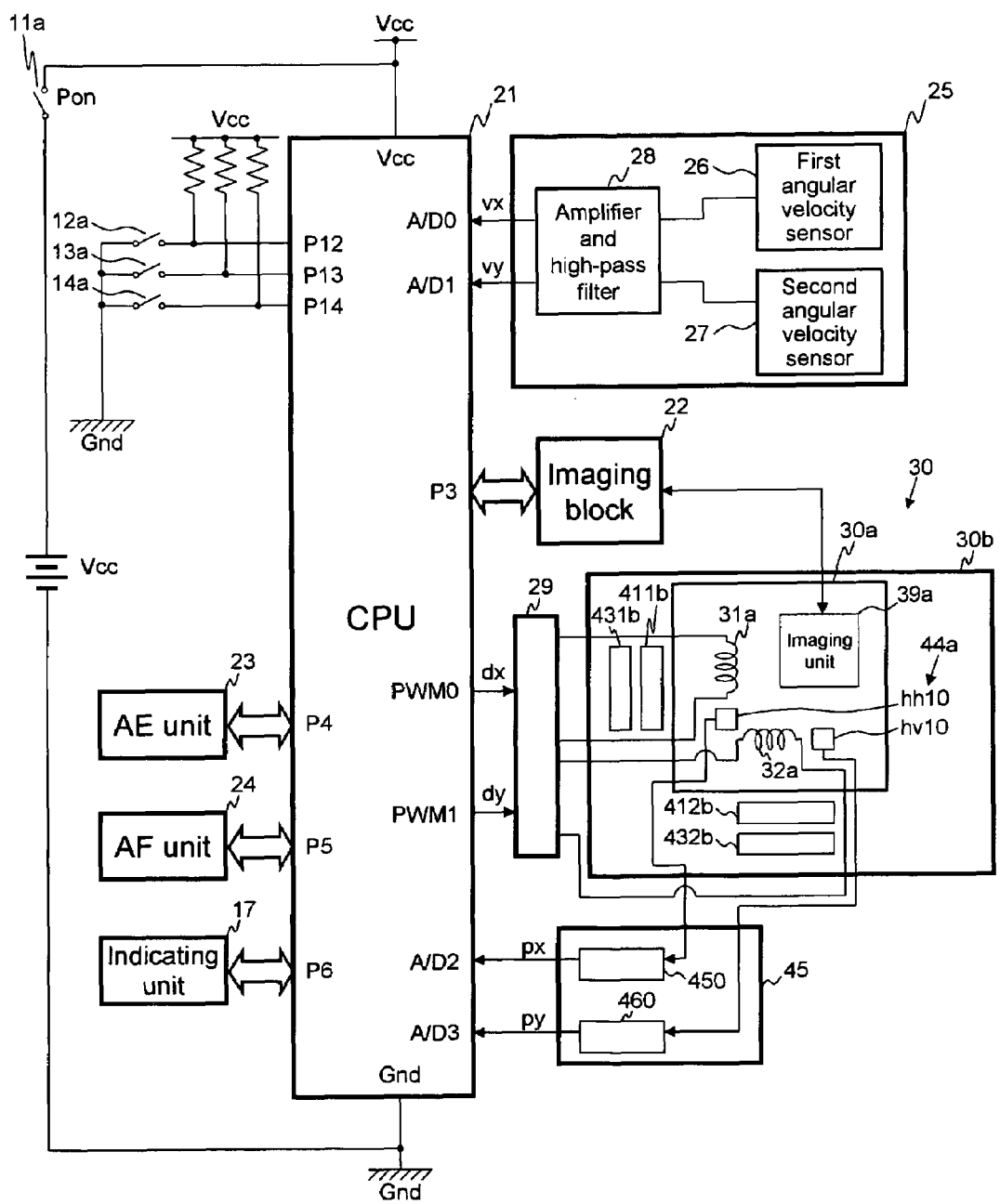
FIG. 3 is a circuit construction diagram of the photographing apparatus.

The imaging part of the photographing apparatus 1 comprises a Pon button 11, a Pon switch 11a, a photometric switch 12a, a release button 13, a release switch 13a, an indicating unit 17 such as an LCD monitor etc., a CPU 21, an imaging block 22, an AE (automatic exposure) unit 23, an AF (automatic focusing) unit 24, an imaging unit 39a in the anti-shake unit 30, and a photographing lens 67 (see FIGS. 1, 2, and 3).

Whether the Pon switch 11a is in the on state or the off state, is determined by a state of the Pon button 11, so that the on/off states of the photographing apparatus 1 are changed corresponding to the on/off states of the Pon switch 11a.

The photographic subject image is taken as an optical image through the photographing lens 67 by the imaging block 22, which drives the imaging unit 39a, so that the image, which is taken, is indicated on the indicating unit 17. The photographic subject image can be optically observed by the optical finder (not depicted).

Whether the image, which is taken by the imaging block 22, is to be indicated on the indicating unit 17, is determined by a value of a center-flag parameter Ce. The center-flag parameter Ce is temporarily stored in the CPU 21. When the value of the center-flag parameter Ce is 1, the image is indicated on the indicating unit 17. When the value of the center-flag parameter Ce is 0, the image is not indicated on the indicating unit 17. However, the other operations, such as accumulating an electric charge etc., are performed in parallel, only without the indicating operation. Further, the image, which is imaged under the condition where the release switch 13a is set to the on state, is indicated on the indicating unit 17, without being related to the value of the center-flag parameter Ce. The indicating unit 17 is connected with the port P6 of the CPU 21.

The value of the center-flag parameter Ce is set to 1, when the movable unit 30a is located at the center of its movement range in both the first direction x and the second direction y, as a specified point. The value of the center-flag parameter Ce is not set to 1, when the movable unit 30a is not located at the center of its movement range in the first direction x and the second direction y, as a specified point.

Further, even if the movable unit 30a is located at the center of its movement range when detecting the position of the movable unit 30a in the present anti-shake operation, the value of the center-flag parameter Ce is not set to 1 in the case where the movable unit 30a was not located at the center of its movement range when detecting the position of the movable unit 30a in the anti-shake operation immediately before (before 1 ms).

The CPU 21 is a control apparatus, which controls each part of the photographing apparatus 1 regarding the imaging operation, and controls each part of the photographing apparatus 1 regarding the anti-shake operation. The anti-shake operation controls the movement of the movable unit 30a and controls detecting the position of the movable unit 30a.

The CPU 21 temporarily stores the value of the center-flag parameter Ce and the parameter IS regarding the anti-shake mode, which is described later.

The CPU 21 judges how many values of the center-flag parameter Ce and the parameter IS are set up.

The CPU 21 prohibits indicating an image on the indicating unit 17, from when the photographing apparatus 1 is set to the on state, to when the movable unit 30a has reached a specified point of a movement range of the movable unit 30a. In this embodiment, the specified point is the center of its movement range.

When the release button 13 is half pushed by the operator, the photometric switch 12a changes to the on state, so that the photometric operation, the AF sensing operation, and the focusing operation are performed.

When the release button 13 is fully pushed by the operator, the release switch 13a changes to the on state, so that the imaging operation is performed, and the image, which is taken, is stored.

The imaging block 22 drives the imaging unit 39a. The AE unit 23 performs the photometric operation for the photographic subject, calculates the photometric values, and calculates the aperture value and the time length of the exposure time, which is needed for imaging, corresponding to the photometric values. The AF unit 24 performs the AF sensing operation, and performs the focusing operation, which is needed for the imaging, corresponding to the result of the AF sensing operation. In the focusing operation, the position of the photographing lens 67 is moved in the optical axis LX direction.

The anti-shaking part of the photographing apparatus 1 comprises an anti-shake button 14, an anti-shake switch 14a, an indicating unit 17, a CPU 21, an angular velocity detecting unit 25, a driver circuit 29, an anti-shake unit 30, a hall-element signal-processing unit 45, and the photographing lens 67.

When the anti-shake button 14 is fully pushed by the operator, the anti-shake switch 14a changes to the on state, so that the anti-shake operation is performed where the angular velocity detecting unit 25 and the anti-shake unit 30 are driven, at every predetermined time interval, independently of the other operations which include the photometric operation etc. When the anti-shake switch 14a is in the on state, in other words in the anti-shake mode, the parameter IS is set to 1 (IS=1). When the anti-shake switch 14a is not in the on state, in other words in the non anti-shake mode, the parameter IS is set to 0 (IS=0) In this embodiment, the predetermined time interval is 1 ms.

The various output commands corresponding to the input signals of these switches are controlled by the CPU 21.

The information regarding whether the photometric switch 12a is in the on state or in the off state, is input to port P12 of the CPU 21 as a 1-bit digital signal. The information regarding whether the release switch 13a is in the on state or in the off state, is input to port P13 of the CPU 21 as a 1-bit digital signal. The information regarding whether the anti-shake switch 14a is in the on state or in the off state, is input to port P14 of the CPU 21 as a 1-bit digital signal.

The imaging block 22 is connected to port P3 of the CPU 21 for inputting and outputting signals. The AE unit 23 is connected to port P4 of the CPU 21 for inputting and outputting signals. The AF unit 24 is connected to port P5 of the CPU 21 for inputting and outputting signals.

Next, the details of the input and output relationship with the CPU 21 for the angular velocity unit 25, the driver circuit 29, the anti-shake unit 30, and the hall-element signal-processing unit 45 are explained.

The angular velocity unit 25 has a first angular velocity sensor 26, a second angular velocity sensor 27, and a combined amplifier and high-pass filter circuit 28. The first angular velocity sensor 26 detects the velocity-component in the first direction x of the angular velocity of the photographing apparatus 1, at every predetermined time interval (1 ms). The second angular velocity sensor 27 detects the velocity-component in the second direction y of the angular velocity of the photographing apparatus 1, at every predetermined time interval (1 ms).

The combined amplifier and high-pass filter circuit 28 amplifies the signal regarding the first direction x of the angular velocity (the velocity-component in the first direction x of the angular velocity), reduces a null voltage and a panning of the first angular velocity sensor 26, and outputs the analogue signal to the A/D converter A/D 0 of the CPU 21 as a first angular velocity vx.

The combined amplifier and high-pass filter circuit 28 amplifies the signal regarding the second direction y of the angular velocity (the velocity-component in the second direction y of the angular velocity), reduces a null voltage and a panning of the second angular velocity sensor 27, and outputs the analogue signal to the A/D converter A/D 1 of the CPU 21 as a second angular velocity vy.

The CPU 21 converts the first angular velocity vx which is input to the A/D converter A/D 0 and the second angular velocity vy which is input to the A/D converter A/D 1 to digital signals (A/D converting operation), and calculates the hand-shake quantity, which occurs in the predetermined time (1 ms), on the basis of the converted digital signals and the converting coefficient, where focal distance is considered. Accordingly, the CPU 21 and the angular velocity detecting unit 25 have a function which calculates the hand-shake quantity.

The CPU 21 calculates the position S of the imaging unit 39a (the movable unit 30a), which should be moved to, corresponding to the hand-shake quantity which is calculated, for the first direction x and the second direction y.

However, the position S to which the imaging unit 39a (the movable unit 30a) should be moved, is set to the center of the movement range (which is described later), immediately after the power to the photographing apparatus 1 is set to the on state (power on), from the off-state (power off).

The location in the first direction x of the position S is defined as sx, and the location in the second direction y of the position S is defined as sy. The movement of the movable unit 30a, which includes the imaging unit 39a, is performed by using electromagnetic force and is described later. The driving force D, which drives the driver circuit 29 in order to move the movable unit 30a to the position S, has a first PWM duty dx as the driving-force component in the first direction x, and a second PWM duty dy as the driving-force component in the second direction y.

The anti-shake unit 30 is an apparatus which corrects the hand-shake effect, by moving the imaging unit 39a to the position S, by canceling lag of the photographic subject image on the imaging surface of the imaging device 39a1, and by stabilizing the photographing subject image that reaches the imaging surface of the imaging device 39a1.

The anti-shake unit 30 has a movable unit 30a, which includes the imaging unit 39a, and a fixed unit 30b. Or, the anti-shake unit 30 is composed of a driving part which moves the movable unit 30a by electro-magnetic force to the position S, and a position-detecting part which detects the position of the movable unit 30a (a detected-position P).

The size and the direction of the electromagnetic force are determined by the size and the direction of the current which flows in the coil, and the size and the direction of the magnetic-field of the magnet.

The driving of the movable unit 30a of the anti-shake unit 30, is performed by the driver circuit 29 which has the first PWM duty dx input from the PWM 0 of the CPU 21 and has the second PWM duty dy input from the PWM 1 of the CPU 21. The detected-position P of the movable unit 30a, either before moving or after moving, which is moved by driving the driver circuit 29, is detected by the hall element unit 44a and the hall-element signal-processing unit 45.

Information of a first location in the first direction x for the detected-position P, in other words a first detected-position signal px is input to the A/D converter A/D 2 of the CPU 21. The first detected-position signal px is an analogue signal, and is converted to a digital signal through the A/D converter A/D 2 (A/D converting operation). The first location in the first direction x for the detected-position P, after the A/D converting operation, is defined as pdx, corresponding to the first detected-position signal px.

Information of a second location in the second direction y for the detected-position P, in other words a second detected-position signal py is input to the A/D converter A/D 3 of the CPU 21. The second detected-position signal py is an analogue signal, and is converted to a digital signal through the A/D converter A/D 3 (A/D converting operation). The second location in the second direction y for the detected-position P, after the A/D converting operation, is defined as pdy, corresponding to the second detected-position signal py.

The PID (Proportional Integral Differential) control is performed on the basis of the data for the detected-position P (pdx, pdy) and the data for the position S (sx, sy) which should be moved to.

The movable unit 30a has a first driving coil 31a, a second driving coil 32a, an imaging unit 39a, a hall element unit 44a, a movable circuit board 49a, a shaft for movement 50a, a first bearing unit for horizontal movement 51a, a second bearing unit for horizontal movement 52a, a third bearing unit for horizontal movement 53a, and a plate 64a (see FIGS. 4 and 5).

The fixed unit 30b has a position-detecting magnet unit, a first position-detecting and driving yoke 431b, a second position-detecting and driving yoke 432b, a first bearing unit for vertical movement 54b, a second bearing unit for vertical movement 55b, a third bearing unit for vertical movement 56b, a fourth bearing unit for vertical movement 57b, and a base board 65b. The position-detecting magnet unit has a first position-detecting and driving magnet 411b and a second position-detecting and driving magnet 412b.

The shaft for movement 50a of the movable unit 30a has a channel shape when viewed from the third direction z. The first, second, third, and fourth bearing units for vertical movement 54b, 55b, 56b, and 57b are attached to the base board 65b of the fixed unit 30b. The shaft for movement 50a is slidably supported in the vertical direction (the second direction y), by the first, second, third, and fourth bearing units for vertical movement 54b, 55b, 56b, and 57b.

The first and second bearing units for vertical movement 54b and 55b have slots which extend in the second direction y.

Therefore, the movable unit 30a can move relative to the fixed unit 30b, in the vertical direction (the second direction y).

The shaft for movement 50a is slidably supported in the horizontal direction (the first direction x), by the first, second, and third bearing units for horizontal movement 51a, 52a, and 53a of the movable unit 30a. Therefore, the movable unit 30a, except for the shaft for movement 50a, can move relative to the fixed unit 30b and the shaft for movement 50a, in the horizontal direction (the first direction x).

When the center area of the imaging device 39a1 is located on the optical axis LX of the photographing lens 67, the location relation between the movable unit 30a and the fixed unit 30b is set up so that the movable unit 30a is located at the center of its movement range in both the first direction x and the second direction y, in order to utilize the full size of the imaging range of the imaging device 39a1.

A rectangle shape, which forms the imaging surface (the valid pixel area) of the imaging device 39a1, has two diagonal lines. In this embodiment, the center of the imaging device 39a1 is the crossing point of these two diagonal lines.

In this embodiment, the center of the imaging device 39a1 agrees with the center of gravity of the rectangle shape of the valid pixel area. Accordingly, when the movable unit 30a is located at the center of its movement range, the center of gravity of the rectangle shape of the valid pixel area is located on the optical axis LX of the photographing lens 67.

The movable unit 30a is moved in the movement range in the anti-shake mode (IS=1), so that the movable unit 30a is fixed at the center of its movement range in the non anti-shake mode (IS=0).

Moving the movable unit 30a in the first direction x in the anti-shake mode and fixing the movable unit 30a in the first direction x in the non anti-shake mode are performed by using a first electro-magnetic force.

Moving the movable unit 30a in the second direction y in the anti-shake mode and fixing the movable unit 30a in the second direction y in the non anti-shake mode are performed by using a second electromagnetic force.

The first electro-magnetic force occurs on the basis of the current direction of the first driving coil 31a and the magnetic-field direction of the first position-detecting and driving magnet 411b.

The second electro-magnetic force occurs on the basis of the current direction of the second driving coil 32a and the magnetic-field direction of the second position-detecting and driving magnet 412b.

The imaging unit 39a, the plate 64a, and the movable circuit board 49a are attached, in this order along the optical axis LX direction, viewed from the side of the photographing lens 67. The imaging unit 39a has an imaging device 39a1 (such as a CCD or a COMS etc.), a stage 39a2, a holding unit 39a3, and an optical low-pass filter 39a4. The stage 39a2 and the plate 64a hold and urge the imaging device 39a1, the holding unit 39a3, and the optical low-pass filter 39a4 in the optical axis LX direction.

The first, second, and third bearing units for horizontal movement 51a, 52a, and 53a are attached to the stage 39a2. The imaging device 39a1 is attached to the plate 64a, so that positioning of the imaging device 39a1 is performed where the imaging device 39a1 is perpendicular to the optical axis LX of the photographing lens 67. In the case where the plate 64a is made of a metallic material, the plate 64a has the effect of radiating heat from the imaging device 39a1, by contacting the imaging device 39a1.

The first driving coil 31a, the second driving coil 32a, and the hall element unit 44a are attached to the movable circuit board 49a.

The first driving coil 31a forms a seat and a spiral shape coil pattern. The coil pattern of the first driving coil 31a has lines which are parallel to either the first direction x or the second direction y, where the movable unit 30a which includes the first driving coil 31a, is moved in the first direction x, by the first electro-magnetic force. The lines which are parallel to the second direction y, are used for moving the movable unit 30a in the first direction x. The lines which are parallel to the second direction y, have a first effective length L1.

The second driving coil 32a forms a seat and a spiral shape coil pattern. The coil pattern of the second driving coil 32a has lines which are parallel to either the first direction x or the second direction y, where the movable unit 30a which includes the second driving coil 32a, is moved in the second direction y, by the second electro-magnetic force. The lines which are parallel to the first direction x, are used for moving the movable unit 30a in the second direction y. The lines which are parallel to the first direction x, have a second effective length L2.

The first and second driving coils 31a and 32a are connected with the driver circuit 29 which drives the first and second driving coils 31a and 32a through the flexible circuit board (not depicted). The first PWM duty dx is input to the driver circuit 29 from the PWM 0 of the CPU 21, and the second PWM duty dy is input to the driver circuit 29 from the PWM 1 of the CPU 21. The driver circuit 29 supplies power to the first driving coil 31a corresponding to the value of the first PWM duty dx, and to the second driving coil 32a corresponding to the value of the second PWM duty dy, to drive the movable unit 30a.

The first position-detecting and driving magnet 411b is attached to the movable unit side of the fixed unit 30b, where the first position-detecting and driving magnet 411b faces the first driving coil 31a and the horizontal hall element hh10 in the third direction z.

The second position-detecting and driving magnet 412b is attached to the movable unit side of the fixed unit 30b, where the second position-detecting and driving magnet 412b faces the second driving coil 32a and the vertical hall element hv10 in the third direction z.

The first position-detecting and driving magnet 411b is attached to the first position-detecting and driving yoke 431b, under the condition where the N pole and S pole are arranged in the first direction x. The first position-detecting and driving yoke 431b is attached to the base board 65b of the fixed unit 30b, on the side of the movable unit 30a, in the third direction z.

The length of the first position-detecting and driving magnet 411b in the second direction y, is longer in comparison with the first effective length L1 of the first driving coil 31a. The magnetic-field which influences the first driving coil 31a and the horizontal hall element hh10, is not changed during movement of the movable unit 30a in the second direction y.

The second position-detecting and driving magnet 412b is attached to the second position-detecting and driving yoke 432b, under the condition where the N pole and S pole are arranged in the second direction y. The second position-detecting and driving yoke 432b is attached to the base board 65b of the fixed unit 30b, on the side of the movable unit 30a, in the third direction z.

The length of the second position-detecting and driving magnet 412b in the first direction x, is longer in comparison with the second effective length L2 of the second driving coil 32a. The magnetic-field which influences the second driving coil 32a and the vertical hall element hv10, is not changed during movement of the movable unit 30a in the first direction x.

The first position-detecting and driving yoke 431b is made of a soft magnetic material, and forms a square-u-shape channel when viewed from the second direction y. The first position-detecting and driving magnet 411b, the first driving coil 31a, and the horizontal hall element hh10 are inside the channel of the first position-detecting and driving yoke 431b.

The side of the first position-detecting and driving yoke 431b, which contacts the first position-detecting and driving magnet 411b, prevents the magnetic-field of the first position-detecting and driving magnet 411b from leaking to the surroundings.

The other side of the first position-detecting and driving yoke 431b (which faces the first position-detecting and driving magnet 411b, the first driving coil 31a, and the movable circuit board 49a) raises the magnetic-flux density between the first position-detecting and driving magnet 411b and the first driving coil 31a, and between the first position-detecting and driving magnet 411b and the horizontal hall element hh10.

The second position-detecting and driving yoke 432b is made of a soft magnetic material, and forms a square-u-shape channel when viewed from the first direction x. The second position-detecting and driving magnet 412b, the second driving coil 32a, and the vertical hall element hv10 are inside the channel of the second position-detecting and driving yoke 432b.

The side of the second position-detecting and driving yoke 432b, which contacts the second position-detecting and driving magnet 412b, prevents the magnetic-field of the second position-detecting and driving magnet 412b from leaking to the surroundings.

The other side of the second position-detecting and driving yoke 432b (which faces the second position-detecting and driving magnet 412b, the second driving coil 32a, and the movable circuit board 49a) raises the magnetic-flux density between the second position-detecting and driving magnet 412b and the second driving coil 32a, and between the second position-detecting and driving magnet 412b and the vertical hall element hv10.

The hall element unit 44a is a one-axis hall element which has two hall elements that are magnetoelectric converting elements (magnetic-field change-detecting elements) using the Hall Effect. The hall element unit 44a detects the first detected-position signal px which is used for specifying the first location in the first direction x for the present position P of the movable unit 30a, and the second detected-position signal py which is used for specifying the second location in the second direction y for the present position P of the movable unit 30a.

One of the two hall elements is a horizontal hall element hh10 for detecting the first location in the first direction x of the movable unit 30a, so that the other is a vertical hall element hv10 for detecting the second location in the second direction y of the movable unit 30a (see FIG. 4).

The horizontal hall element hh10 is attached to the movable circuit board 49a of the movable unit 30a, under the condition where the horizontal hall element hh10 faces the first position-detecting and driving magnet 411b of the fixed unit 30b, in the third direction z.

The vertical hall element hv10 is attached to the movable circuit board 49a of the movable unit 30a, under the condition where the vertical hall element hv10 faces the second position-detecting and driving magnet 412b of the fixed unit 30b, in the third direction z.

When the center of the imaging device 39a1, passes through the optical axis LX, it is desirable that the horizontal hall element hh10 is located at a place on the hall element unit 44a which faces an intermediate area between the N pole and S pole of the first position-detecting and driving magnet 411b in the first direction x, viewed from the third direction z, to perform the position-detecting operation utilizing the full size of the range where an accurate position-detecting operation can be performed based on the linear output-change (linearity) of the one-axis hall element.

Similarly, when the center of the imaging device 39a1, passes through the optical axis LX, it is desirable that the vertical hall element hv10 is located at a place on the hall element unit 44a which faces an intermediate area between the N pole and S pole of the second position-detecting and driving magnet 412b in the second direction y, viewed from the third direction z.

The base board 65b is a plate state member which becomes the base for attaching the first position-detecting and driving yoke 431b etc., and is arranged being parallel to the imaging surface of the imaging device 39a1.

In this embodiment, the base board 65b is arranged at the side nearer to the photographing lens 67 in comparison with the movable circuit board 49a, in the third direction z. However, the movable circuit board 49a may be arranged at the side nearer to the photographing lens 67 in comparison with the base board 65b. In this case, the first and second driving coils 31a and 32a, and the hall element unit 44a are arranged on the opposite side of the movable circuit board 49a to the photographing lens 67, so that the first and second position-detecting and driving magnets 411b and 412b are arranged on the same side of the base board 65b as the photographing lens 67.

The hall-element signal-processing unit 45 has a first hall-element signal-processing circuit 450 and a second hall-element signal-processing circuit 460.

The first hall-element signal-processing circuit 450 detects a horizontal potential-difference x10 between output terminals of the horizontal hall element hh10, based on an output signal of the horizontal hall element hh10.

The first hall-element signal-processing circuit 450 outputs the first detected-position signal px, which specifies the first location in the first direction x of the movable unit 30a, to the A/D converter A/D 2 of the CPU 21, on the basis of the horizontal potential-difference x10.

The second hall-element signal-processing circuit 460 detects a vertical potential-difference y10 between output terminals of the vertical hall element hv10, based on an output signal of the vertical hall element hv10.

The second hall-element signal-processing circuit 460 outputs the second detected-position signal py, which specifies the second location in the second direction y of the movable unit 30a, to the A/D converter A/D 3 of the CPU 21, on the basis of the vertical potential-difference y10.

Figure 6:
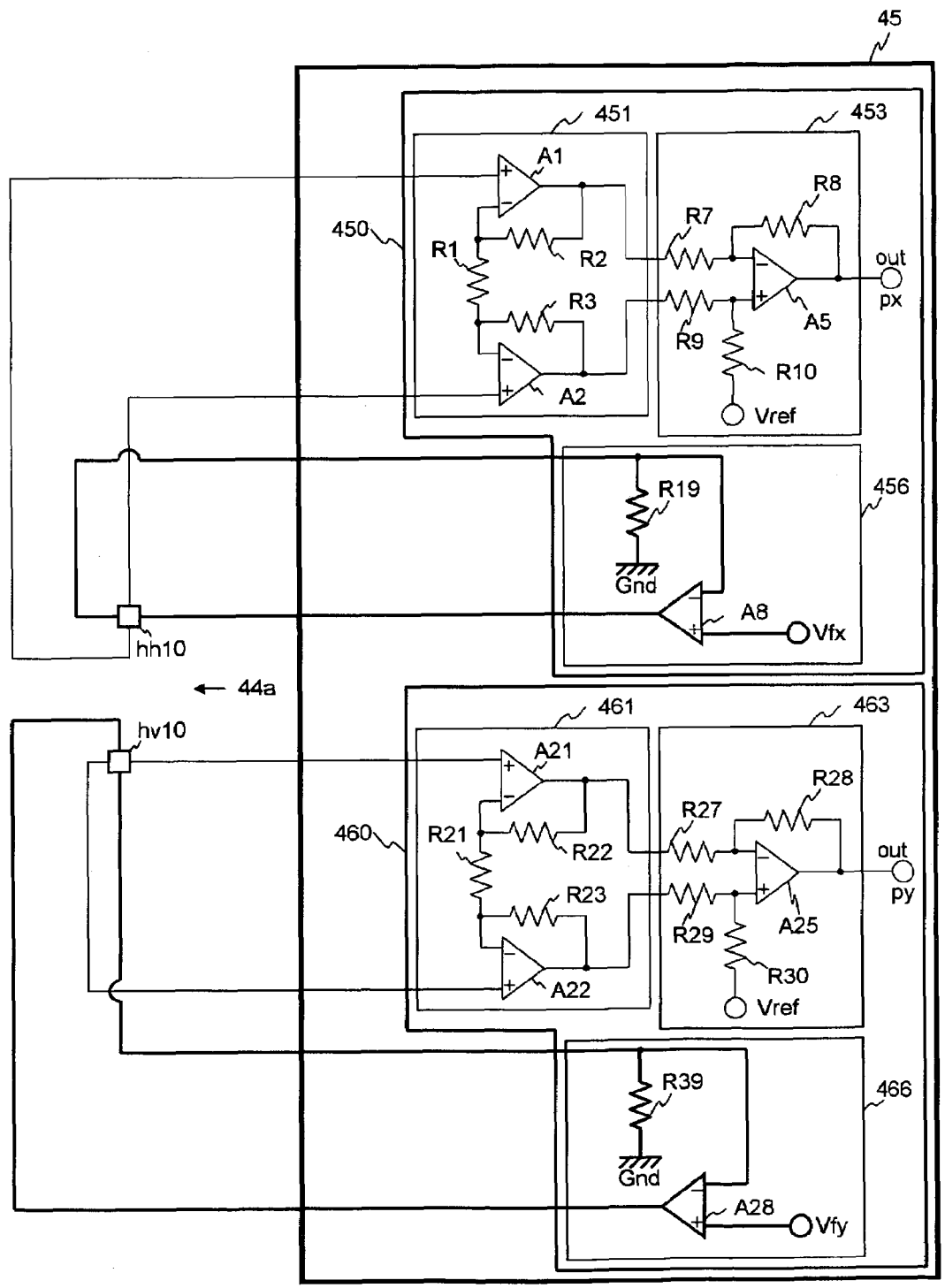
FIG. 6 is a circuit construction diagram of the circuit the hall element unit and the hall-element signal-processing unit.

The circuit construction regarding input/output signals of the horizontal hall element hh10, in the first hall-element signal-processing circuit 450 of the hall-element signal-processing circuit 45, and the circuit construction regarding input/output signals of the vertical hall element hv10, in the second hall-element signal-processing circuit 460 of the hall-element signal-processing circuit 45 are explained using FIG. 6.

The first hall-element signal-processing circuit 450 has a circuit 451 and a circuit 453 for controlling the output of the horizontal hall element hh10, and has a circuit 456 for controlling the input of the horizontal hall element hh10.

The second hall-element signal-processing circuit 460 has a circuit 461 and a circuit 463 for controlling the output of the vertical hall element hv10, and has a circuit 466 for controlling the input of the vertical hall element hv10.

Both output terminals of the horizontal hall element hh10 are connected with the circuit 451, so that the circuit 451 is connected with the circuit 453.

The circuit 451 is a differential amplifier circuit which amplifies the signal difference between the output terminals of the horizontal hall element hh10.

The circuit 453 is a subtracting amplifier circuit which calculates the horizontal potential-difference x10 (the hall output voltage) on the basis of the difference between the amplified signal difference from the circuit 451 and a reference voltage Vref, and which calculates the first detected-position signal px by multiplying a predetermined amplification rate by the horizontal potential-difference x10.

The circuit 451 has a resistor R1, a resistor R2, a resistor R3, an operational amplifier A1, and an operational amplifier A2. The operational amplifier A1 has an inverting input terminal, a non-inverting input terminal, and an output terminal. The operational amplifier A2 has an inverting input terminal, a non-inverting input terminal, and an output terminal.

One of the output terminals of the horizontal hall element hh10 is connected with the non-inverting input terminal of the operational amplifier A1, so that the other terminal of the horizontal hall element hh10 is connected with the non-inverting input terminal of the operational amplifier A2.

The inverting input terminal of the operational amplifier A1 is connected with the resistors R1 and R2, so that the inverting input terminal of the operational amplifier A2 is connected with the resistors R1 and R3.

The output terminal of the operational amplifier A1 is connected with the resistor R2 and the resistor R7 in the circuit 453. The output terminal of the operational amplifier A2 is connected with the resistor R3 and the resistor R9 in the circuit 453.

The circuit 453 has a resistor R7, a resistor R8, a resistor R9, a resistor R10, and an operational amplifier A5. The operational amplifier A5 has an inverting input terminal, a non-inverting input terminal, and an output terminal.

The inverting input terminal of the operational amplifier A5 is connected with the resistors R7 and R8. The non-inverting input terminal of the operational amplifier A5 is connected with the resistors R9 and R10. The output terminal of the operational amplifier A5 is connected with the resistor R8. The first detected-position signal px, which is obtained by multiplying the predetermined amplification rate, by the horizontal potential-difference x10, is output from the output terminal of the operational amplifier A5. One of the terminals of the resistor R10 is connected with the power supply whose voltage is the reference voltage Vref.

The values of the resistors R2 and R3 are the same. The values of the resistors R7 and R9 are the same. The values of the resistors R8 and R10 are the same.

This predetermined amplification rate is based on the values of the resistors R7~R10 (the ratio of the value of the resistor R7 to the value of the resistor R8).

The operational amplifiers A1 and A2 are the same type of amplifier.

The circuit 456 has a resistor R19 and an operational amplifier A8. The operational amplifier A8 has an inverting input terminal, a non-inverting input terminal, and an output terminal.

The inverting input terminal of the operational amplifier A8 is connected with the resistor R19 and one of the input terminals of the horizontal hall element hh10. The potential of the non-inverting input terminal of the operational amplifier A8 is set at voltage Vfx corresponding to the value of the current passing through the input terminals of the horizontal hall element hh10. The output terminal of the operational amplifier A8 is connected with the other input terminal of the horizontal hall element hh10. One of the terminals of the resistor R19 is grounded.

Both output terminals of the vertical hall element hv10 are connected with the circuit 461, so that the circuit 461 is connected with the circuit 463.

The circuit 461 is a differential amplifier circuit which amplifies the signal difference between the output terminals of the vertical hall element hv10.

The circuit 463 is a subtracting amplifier circuit which calculates the vertical potential-difference y10 (the hall output voltage) on the basis of the difference between the amplified signal difference from the circuit 461 and a reference voltage Vref, and which calculates the second detected-position signal py by multiplying a predetermined amplification rate by the vertical potential-difference y10.

The circuit 461 has a resistor R21, a resistor R22, a resistor R23, an operational amplifier A21, and an operational amplifier A22. The operational amplifier A21 has an inverting input terminal, a non-inverting input terminal, and an output terminal. The operational amplifier A22 has an inverting input terminal, a non-inverting input terminal, and an output terminal.

One of the output terminals of the vertical hall element hv10 is connected with the non-inverting input terminal of the operational amplifier A21, so that the other terminal of the vertical hall element hv10 is connected with the non-inverting input terminal of the operational amplifier A22.

The inverting input terminal of the operational amplifier A21 is connected with the resistors R21 and R22, so that the inverting input terminal of the operational amplifier A22 is connected with the resistors R21 and R23.

The output terminal of the operational amplifier A21 is connected with the resistor R22 and the resistor R27 in the circuit 463. The output terminal of the operational amplifier A22 is connected with the resistor R23 and the resistor R29 in the circuit 463.

The circuit 463 has a resistor R27, a resistor R28, a resistor R29, a resistor R30, and an operational amplifier A25. The operational amplifier A25 has an inverting input terminal, a non-inverting input terminal, and an output terminal.

The inverting input terminal of the operational amplifier A25 is connected with the resistors R27 and R28. The non-inverting input terminal of the operational amplifier A25 is connected with the resistors R29 and R30. The output terminal of the operational amplifier A25 is connected with the resistor R28. The second detected-position signal py, which is obtained by multiplying the predetermined amplification rate, by the vertical potential-difference y10, is output from the output terminal of the operational amplifier A25. One of the terminals of the resistor R30 is connected with the power supply whose voltage is the reference voltage Vref.

The values of the resistors R22 and R23 are the same. The values of the resistors R27 and R29 are the same. The values of the resistors R28 and R30 are the same.

This predetermined amplification rate is based on the values of the resistors R27~R30 (the ratio of the value of the resistor R27 to the value of the resistor R28).

The operational amplifiers A21 and A22 are the same type of amplifier.

The circuit 466 has a resistor R39 and an operational amplifier A28. The operational amplifier A28 has an inverting input terminal, a non-inverting input terminal, and an output terminal.

The inverting input terminal of the operational amplifier A28 is connected with the resistor R39 and one of the input terminals of the vertical hall element hv10. The potential of the non-inverting input terminal of the operational amplifier A28 is set at voltage Vfy corresponding to the value of the current passing through the input terminals of the vertical hall element hv10. The output terminal of the operational amplifier A28 is connected with the other input terminal of the vertical hall element hv10. One of the terminals of the resistor R39 is grounded.

Figure 7:
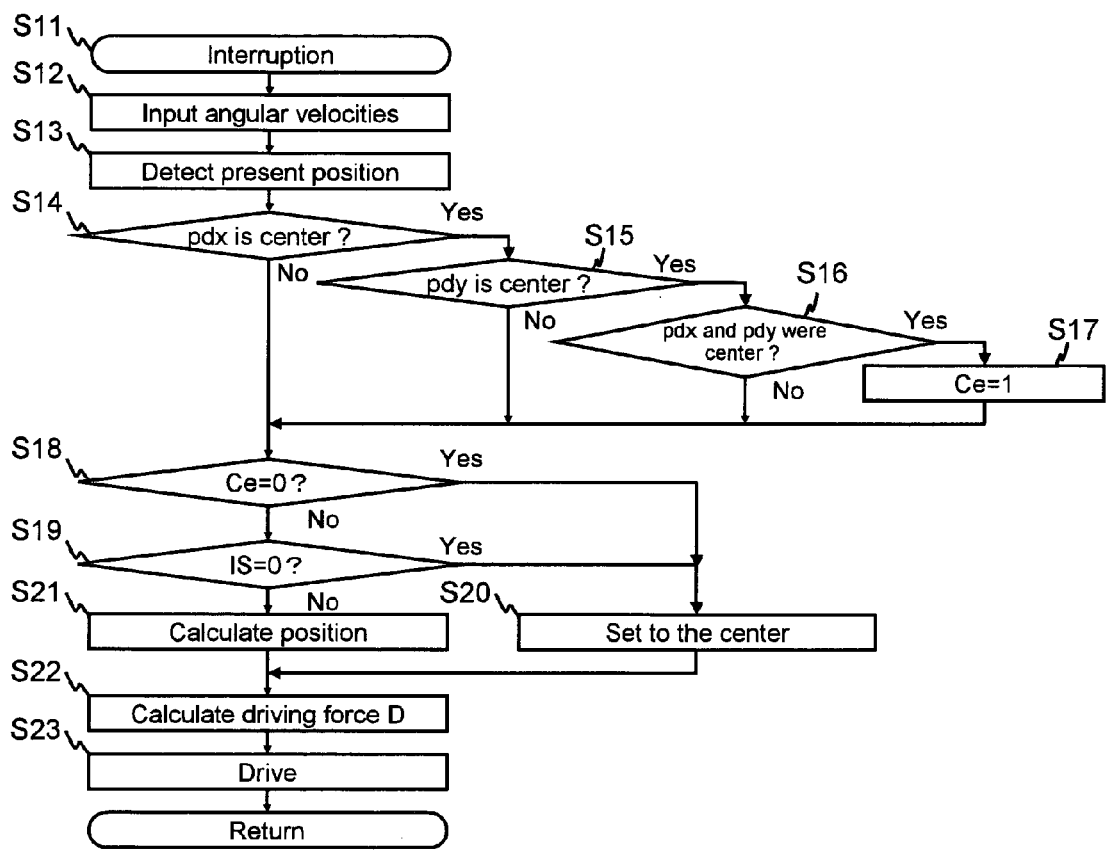
FIG. 7 is a flowchart of the anti-shake operation, which is performed at every predetermined time interval, as an interruption process.

Next, the flow of the anti-shake operation, which is performed at every predetermined time interval (1 ms) as an interruption process, independently of the other operations, is explained by using the flowchart in FIG. 7.

In step S11, the interruption process for the anti-shake operation is started. In step S12, the first angular velocity vx, which is output from the angular velocity detecting unit 25, is input to the A/D converter A/D 0 of the CPU 21 and is converted to a digital signal. The second angular velocity vy, which is output from the angular velocity detecting unit 25, is input to the A/D converter A/D 1 of the CPU 21 and is converted to a digital signal.

In step S13, the position of the movable unit 30a is detected by the hall element unit 44a, so that the first detected-position signal px, which is calculated by the hall-element signal-processing unit 45, is input to the A/D converter A/D 2 of the CPU 21 and is converted to a digital signal (pdx), and the second detected-position signal py, which is calculated by the hall-element signal-processing unit 45, is input to the A/D converter A/D 3 of the CPU 21 and is converted to a digital signal (pdy). Therefore, the present position of the movable unit 30a P (pdx, pdy) is determined.

In step S14, it is judged whether the pdx value is the same as that when the movable unit 30a is in the center of its movement range in the first direction x. When the pdx value is not the same as that when the movable unit 30a is in the center of its movement range in the first direction x, the process is forwarded to step S18.

When the pdx value is the same as that when the movable unit 30a is in the center of its movement range in the first direction x, the process is forwarded to step S15. In step S15, it is judged whether the pdy value is the same as that when the movable unit 30a is in the center of its movement range in the second direction y.

When the pdy value is not the same as that when the movable unit 30a is in the center of its movement range in the second direction y, the process is forwarded to step S18.

When the pdy value is the same as that when the movable unit 30a is in the center of its movement range in the second direction y, the process is forwarded to step S16. In step S16, it is judged whether the pdx value immediately before the anti-shake operation (before 1 ms), is the same as that when the movable unit 30a is in the center of its movement range in the first direction x, and whether the pdy value immediately before the anti-shake operation (before 1 ms), is the same as that when the movable unit 30a is in the center of its movement range in the second direction y.

When the pdx value immediately before the anti-shake operation, is not the same as that when the movable unit 30a is in the center of its movement range in the first direction x, or the pdy value immediately before the anti-shake operation, is not the same as that when the movable unit 30a is in the center of its movement range in the second direction y, the process is forwarded to step S18.

When the pdx value immediately before the anti-shake operation, is the same as that when the movable unit 30a is in the center of its movement range in the first direction x, and the pdy value immediately before the anti-shake operation, is the same as that when the movable unit 30a is in the center of its movement range in the second direction y, the process is forwarded to step S17. In step S17, the value of the center-flag parameter Ce is set to 1.

The judgment in step S16, is performed in order to distinguish a first pattern and a second pattern. The first pattern is the case where the movable unit 30a passes through the center of its movement range in both the first direction x and the second direction y, while the movable unit 30a is moving in its movement range. The second pattern is the case where movement of the movable unit 30a to the center of its movement range, is finished.

The value of the center-flag parameter Ce is used for the imaging operation which is described later.

In step S18, it is judged whether the value of the center-flag parameter Ce is 0. When the value of the center-flag parameter Ce is 0, in other words the movable unit 30a has not reached and not fixed the center of its movement range in both the first direction x and the second direction y, the process is forwarded to step S20. When the value of the center-flag parameter Ce is not 0 (or, the center-flag parameter Ce is 1), the process is forwarded to step S19.

In step S19, it is judged whether the value of the IS is 0. When it is judged that the value of the IS is 0 (IS=0), in other words in the non anti-shake mode, the position S (sx, sy) of the movable unit 30a (the imaging unit 39a), which should be moved to, is set to the center of the movement range of the movable unit 30a, in step S20. When it is judged that the value of the IS is not 0 (IS=1), in other words in the anti-shake mode, the position S (sx, sy) of the movable unit 30a (the imaging unit 39a), which should be moved to, is calculated on the basis of the first and second angular velocities vx and vy, in step S21.

In the anti-shake operation immediately after the power of the photographing apparatus 1 is set to the on state, the position S (sx, sy) of the movable unit 30a (the imaging unit 39a), which should be moved to, is set to the center of movement range of the movable unit 30a.

In step S22, the driving force D, which drives the driver circuit 29 in order to move the movable unit 30a to the position S, in other words the first PWM duty dx and the second PWM duty dy, is calculated on the basis of the position S (sx, sy), which is determined in step S20 or step S21, and the present position P (pdx, pdy).

In step S23, the first driving coil unit 31a is driven by using the first PWM duty dx through the driver circuit 29, and the second driving coil unit 32a is driven by using the second PWM duty dy through the driver circuit 29, so that the movable unit 30a is moved.

The process in steps S22 and S23 is an automatic control calculation, which is used with the PID automatic control for performing general (normal) proportional, integral, and differential calculations.

Figure 8:
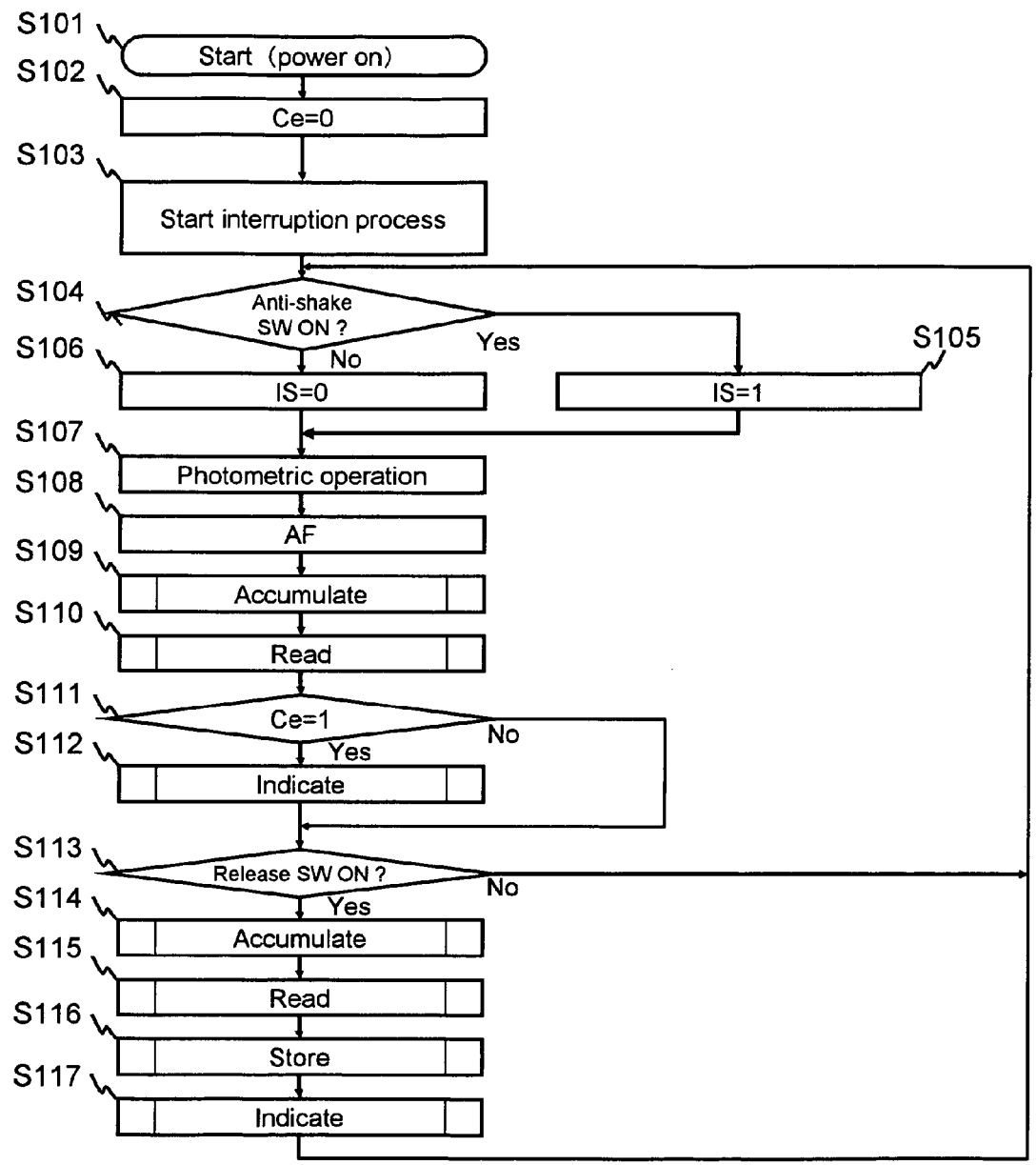
FIG. 8 is a flowchart of the imaging operation.

Next, the flow of the imaging operation is explained by using the flowchart in FIG. 8.

In step S101, the Pon switch 11a is set to the on state (power on), so that the power of the photographing apparatus 1 is set to the on state. In step S102, the center-flag parameter Ce, which is stored in the CPU 21, is initialized, in other words the value of the center-flag parameter Ce is set to 0. In step S103, the anti-shake operation, which is described by using the flowchart in FIG. 7, is started at every predetermined time interval (1 ms) as an interruption process. The anti-shake operation is performed independently of the other operations after step S103.

In step S104, it is judged whether the anti-shake switch 14a is in the on state. When the anti-shake switch 14a is in the on state, the value of the parameter IS is set to 1 in step S105. When the anti-shake switch 14a is in the off state, the value of the parameter IS is set to 0 in step S106.

In step S107, the photometric operation is performed by driving an AE sensor of the AE unit 23, so that the aperture value and the time length of the exposure time are calculated. In step S108, the AF sensing operation is performed by driving an AF sensor of the AF unit 24, so that the focusing operation is performed by driving a lens control circuit of the AF unit 24.

In step S109, the electric charge is accumulated in the imaging device 39a1. In step S110, the electric charge, which is accumulated in the imaging device 39a1 in the exposure time, is read.

In step S111, it is judged whether the value of the center-flag parameter Ce is set to 1 by the anti-shake operation after step S102. When the value of the center-flag parameter Ce is not set to 1 (or, the movable unit 30a is not fixed to the center of its movement range), the process is forwarded to step S113, without indicating the image on the basis of the electric charge, on the indicating unit 17. Or, indicating the image, which is imaged, on the indicating unit 17 is prohibited. When the center-flag parameter Ce is set to 1, the image on the basis of the electric charge is indicated on the indicating unit 17, in step S112.

In step S113, it is judged whether the release switch 13a is set to the on state by the operator. When the release switch 13a is not set to the on state, the process is returned to step S104, so that the imaging operation is repeated. When the release switch 13a is set to the on state, the electric charge is accumulated in the imaging device in step S114. In step S115, the electric charge, which is accumulated in the imaging device 39a1, is read. In step S116, the electric charge, which is read, is stored in a memory in the photographing apparatus 1, as an image which is imaged. In step S117, the image which is stored, is indicated on the indicating unit 17.

This indicating operation is performed without regard to the value of the center-flag parameter Ce. Or, the CPU 21 cancels the prohibition condition of the CPU 21 and indicates the image on the indicating unit 17, even if the movable unit 30a has not reached the center of its movement range, when the release switch 13a is set to the on state by the operator.

After indicating, the process is returned to step S104, so that the imaging operation is repeated.

The image which is imaged by the imaging block 22, is always indicated on the indicating unit 17, so that the image is indicated while the movable unit 30a is moving to the center of its movement range immediately after the photographing apparatus 1 is set to the on state.

The movable unit 30a is positioned at a contact-point which contacts an outer circumference of the movement range according to gravity. Accordingly, the movable unit 30a is moved to the center of its movement range from a contact-point which is located at the outer circumference of the movement range, from when the photographing apparatus 1 is set to the on state.

Figure 9:
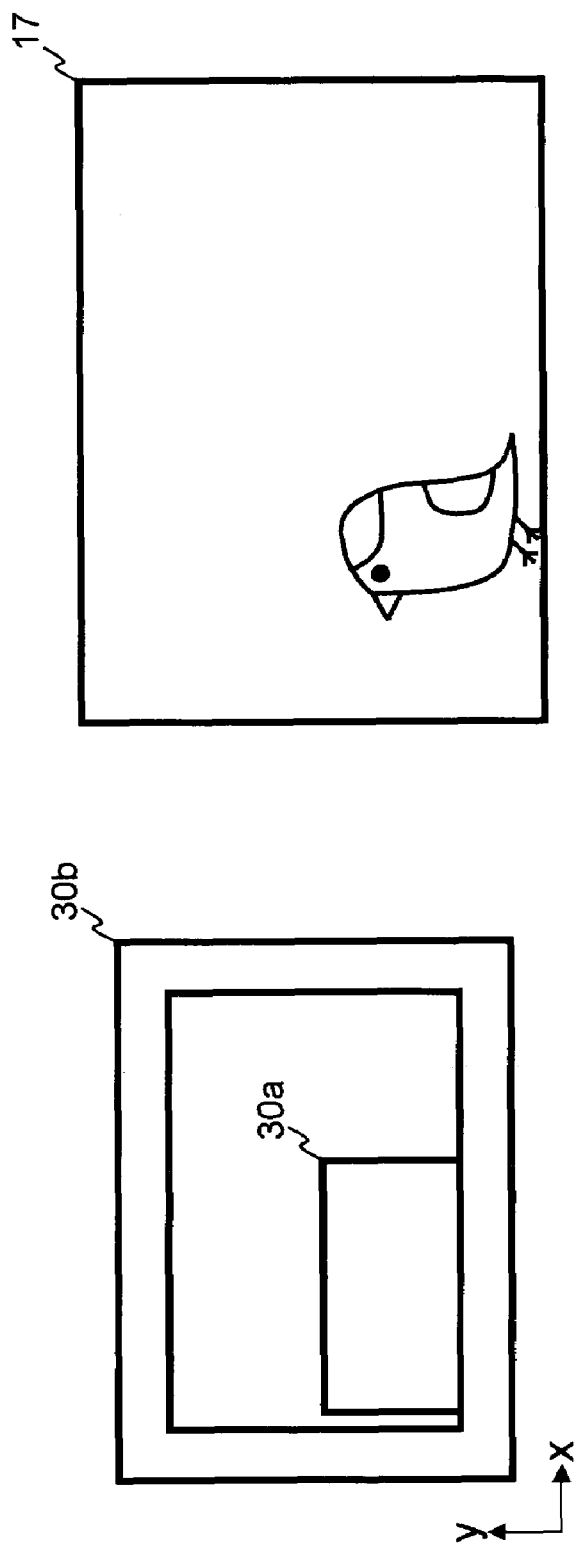
FIG. 9 shows the first condition before the movable unit is moved.
Figure 10:
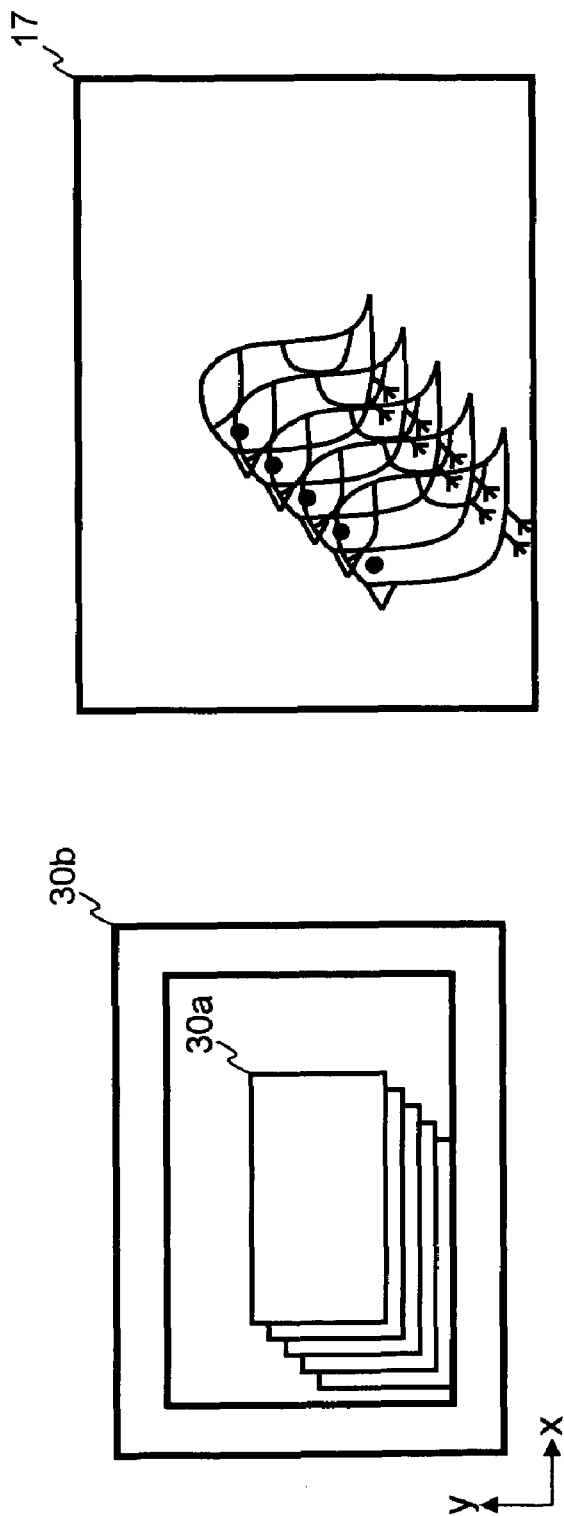
FIG. 10 shows the second condition while the movable unit is moving.

For example, a first condition, a second condition, and a third condition of the movable unit 30a and the indicating unit 17, where the movable unit 30a is moved to the center of its movement range from the left and bottom side of its movement range, are explained by using the FIGS. 9 to 11.

FIG. 9 shows the first condition, before the movable unit 30a is moved. FIG. 10 shows the second condition, while the movable unit 30a is moving. FIG. 11 shows the third condition, after the movable unit 30a has reached the center of its movement range.

In the first condition, a first image which is indicated on the indicating unit 17, is the image which is imaged under the condition where the imaging device is not moving.

However, in the second condition, a second image which is indicated on the indicating unit 17, is the image which is imaged where the imaging device 39a1 is moving. Accordingly, the second image is like a floating image, so that the second image is unpleasant for the operator.

In the third condition, a third image which is indicated on the indicating unit 17, is the image which is imaged under the condition where the imaging device is not moving, similar to the first condition.

Figure 13:
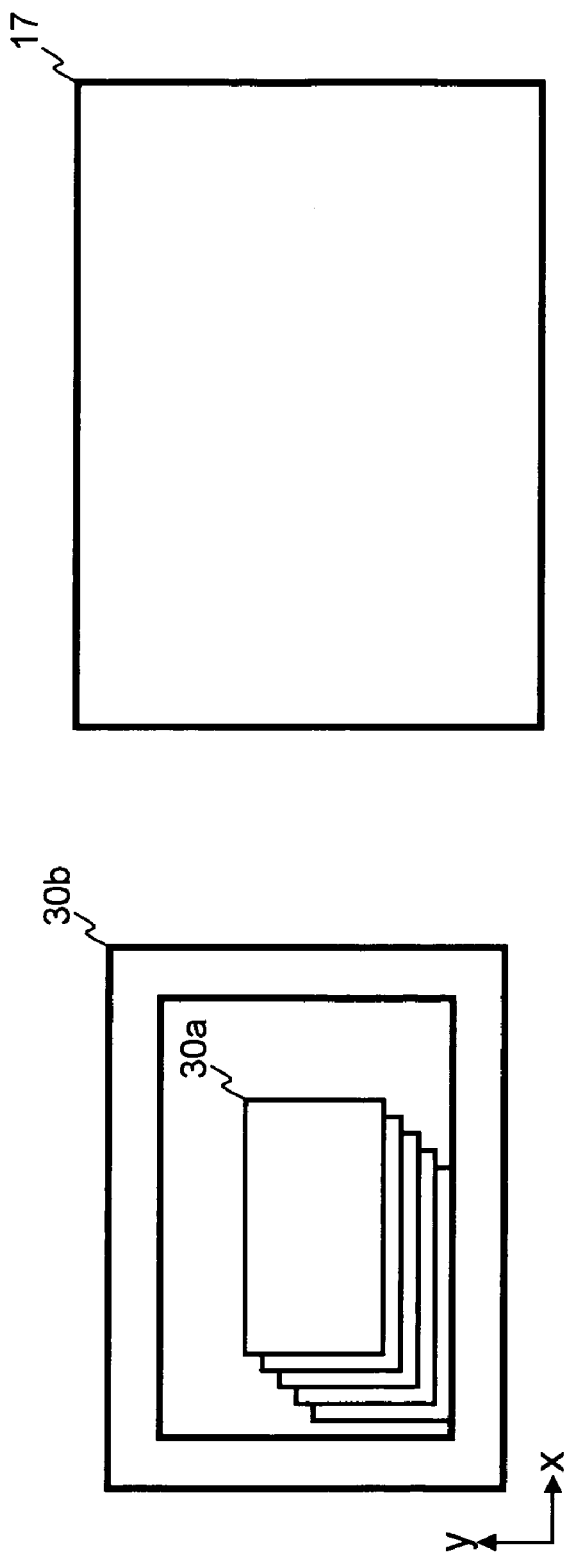
FIG. 13 shows the fifth condition while the movable unit is moving, in this embodiment.

In this embodiment, the image is not indicated on the indicating unit 17 from when the photographing apparatus 1 is set to the on state, to when the movable unit 30a has reached the center of its movement range, so that the unpleasant image like the second image is not indicated (see FIGS. 12 to 14).

FIG. 12 shows the fourth condition, before the movable unit 30a is moved, in this embodiment. FIG. 13 shows the fifth condition, while the movable unit 30a is moving, in this embodiment. FIG. 14 shows the sixth condition, after the movable unit 30a has reached the center of its movement range, in this embodiment.

The image which is imaged, is not indicated on the indicating unit 17, before moving the movable unit 30a in the fourth condition, and while moving the movable unit 30a in the fifth condition. However, the other operations are performed, before moving the movable unit 30a in the fourth condition, and while moving the movable unit 30a in the fifth condition.

The image which is imaged, is indicated on the indicating unit 17 after the movable unit 30a has reached the center of its movement range in the sixth condition.

In this embodiment, a mechanism for fixing the movable unit 30a at the center of its movement range, is not needed, so that the anti-shake apparatus is not enlarged.

In this embodiment, the first position-detecting and driving magnet 411b is one body in order to detect the first location in the first direction x of the movable unit 30a, and drive the movable unit 30a in the first direction x. However a magnet for detecting the first location and a magnet for driving the movable unit 30a in the first direction x, may be separated.

Similarly, the second position-detecting and driving magnet 412b is one body in order to detect the second location in the second direction y of the movable unit 30a, and drive the movable unit 30a in the second direction y. However a magnet for detecting the second location and a magnet for driving the movable unit 30a in the second direction y, may be separated.

Further, it is explained that the hall element unit 44a is attached to the movable unit 30a and the position-detecting magnets (the first and second position-detecting and driving magnets 411b and 412b) are attached to the fixed unit 30b, however the hall element unit may be attached to the fixed unit and position-detecting magnets may be attached to the movable unit.

The magnet which generates a magnetic-field, may be a permanent magnet which always generates the magnetic-field, or an electric magnet which generates the magnetic-field when it is needed.

Further, it is explained that the movable unit 30a has the imaging device 39a1. However, the movable unit 30a may have a hand-shake correcting lens instead of the imaging device.

Further, moving the movable unit 30a is not limited by the electromotive force by the coil and the magnet.

Further, it is explained that the hall element is used for position-detecting as the magnetic-field change-detecting element, however, another detecting element may be used for position-detecting. Specifically, the detecting element may be an MI (Magnetic Impedance) sensor, in other words a highfrequency carrier-type magnetic-field sensor, or a magnetic resonance-type magnetic-field detecting element, or an MR (Magneto-Resistance effect) element. When one of the MI sensor, the magnetic resonance-type magnetic-field detecting element, and the MR element is used, the information regarding the position of the movable unit can be obtained by detecting the magnetic-field change, similar to using the hall element.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2004-053273 (filed on Feb. 27, 2004), which is expressly incorporated herein by reference, in its entirety.

The invention claimed is:

1. An anti-shake apparatus of a photographing apparatus, comprising:
 a movable unit that has one of an imaging device and a hand-shake correcting lens, and that can be moved in first and second directions, said first direction being perpendicular to an optical axis of a photographing lens of said photographing apparatus, and said second direction being perpendicular to said optical axis and to said first direction;
 a fixed unit that slidably supports said movable unit for movement in both said first and second directions;
 an indicating unit that indicates an image imaged by said imaging device; and
 a control apparatus that controls movement of said movable unit and that detects a position of said movable unit;
 said control apparatus prohibiting indicating of said image on said indicating unit, from when said photographing apparatus is set to an ON state, until said movable unit has reached a specified point within a movement range of said movable unit,
 wherein said specified point is the center of said movement range; and
 said movable unit is located at said specified point, when a center area of said imaging device or said hand-shake correcting lens which is included in said movable unit, is located on said optical axis.

2. The anti-shake apparatus according to claim 1, wherein said control apparatus cancels the prohibiting of said control apparatus and indicates said image on said indicating unit, even if said movable unit has not reached said specified point, when a release switch which is included in said photographing apparatus and is connected with said control apparatus, is set to the ON state by an operator.

3. The anti-shake apparatus according to claim 1, wherein one of said movable unit and said fixed unit has a magnetic-field change-detecting unit, said magnetic-field change-detecting unit having a horizontal magnetic-field change-detecting element which is used for detecting said position of said movable unit in said first direction as a first location, and a vertical magnetic-field change-detecting element which is used for detecting said position of said movable unit in said second direction as a second location; and
 another of said movable unit and said fixed unit has a position-detecting magnet unit which is used for detecting said first and second locations, said position-detecting magnet unit having a first position-detecting magnet which is used for detecting said first location and which faces said horizontal magnetic-field change-detecting element, and having a second position-detecting magnet which is used for detecting said second location and which faces said vertical magnetic-field change-detecting element.

4. The anti-shake apparatus according to claim 3, wherein said movable unit has said magnetic-field change-detecting unit and a first driving coil which is used for moving said movable unit in said first direction and a second driving coil which is used for moving said movable unit in said second direction; and
 said fixed unit has said first position-detecting magnet which is used for moving said movable unit in said first direction, and has said second position-detecting magnet which is used for moving said movable unit in said second direction.

5. The anti-shake apparatus according to claim 3, wherein said magnetic-field change-detecting unit is a one-axis hall element; and
 said horizontal magnetic-field change-detecting element and said vertical magnetic-field change-detecting element are hall elements.

6. A method of operating a photographing apparatus, the method comprising:
 displaying an image imaged by an imaging device of the photographing apparatus; and
 controlling a movable unit of the photographing apparatus and detecting a position of the movable unit, the movable unit having one of the imaging device and a hand-shake correcting lens, the controlling comprises prohibiting displaying of the image, from when the photographing apparatus is set to an ON state, until the movable unit has reached a specified point within a movement range of the movable unit,
 wherein the specified point is the center of the movement range of the movable unit.

7. The operating method according. to claim 6, further comprising mounting the movable unit for movement in first and second directions, the first direction being perpendicular to an optical axis of a photographing lens of the photographing apparatus, and the second direction being perpendicular to the optical axis and to the first direction.

8. the operating method according to claim 6, further comprising cancelling the prohibiting and displaying the image, even if the movable unit has not reached the specified point, when a release switch, which is included in the photographing apparatus, is set to the ON state by a operator.

* * * * *